Oct. 19, 1965 KAZUO TAYAMA 3,212,333
LIQUID QUANTITY MEASURING APPARATUS HAVING
MAGNETIC INDICATING MECHANISM
Filed Nov. 1, 1963 2 Sheets-Sheet 2

INVENTOR
KAZUO TAYAMA
BY
Abraham A. Saffitz
ATTORNEY

United States Patent Office 3,212,333
Patented Oct. 19, 1965

3,212,333
LIQUID QUANTITY MEASURING APPARATUS HAVING MAGNETIC INDICATING MECHANISM
Kazuo Tayama, Musashino-shi, Tokyo, Japan, assignor to Kyota Tajiri, Musashino-shi, Tokyo, Japan
Filed Nov. 1, 1963, Ser. No. 320,872
Claims priority, application Japan, Jan. 21, 1963, 38/1,774; Aug. 7, 1963, 38/40,577
1 Claim. (Cl. 73—306)

The present invention relates to an apparatus which is mounted on a cylinder of propane gas or other similar gases in a liquified state and measures and indicates the weight of the liquid in the cylinder.

Heretofore, proper means or equipment have not been available for measuring the quantity of the liquified gas in a cylinder. As the conventional methods of measuring the quantity of a liquified gas in a cylinder there have been; (1) the weight of the liquified gas in a cylinder is calculated by means that the weight of the cylinder including the valve thereon is subtracted from the total weight of the cylinder containing the liquified gas. (2) the amount of gas consumed is integrated by an impeller type gas meter, and the amount of the gas remaining in the cylinder is measured by means that the integrated volume of gas consumed is subtracted from the amount of gas originally charged into the cylinder, and (3) a float and its link system are provided inside the cylinder in such a manner that the vertical movement of the float is transmitted to the outside of cylinder, whereby a liquid volume indicator indicates the volume of the liquid in correspondence with the vertical movement of the float. However, those are all troublesome methods with following deficiencies.

A scale is specifically required for measuring the weight in case of (1) and it is not suitable for domestic use. The volume of liquified gas is indicated, but its weight is unknown in case of (2). The liquid level is indicated in case of (3), but it does not always indicate the correct weight of liquified gases of different specific gravity or even in the same liquified gas the liquid level does not always give the correct liquid weight because of the change of specific gravity due to the change of temperature.

One of the objects of the present invention is to furnish an improved measuring and indicating apparatus for the liquified gas weight that has no deficiencies as in the conventional means or methods described above, or the present invention is to furnish a liquid weight measuring apparatus in which an increase or decrease of the liquid in a cylinder is converted into the vertical movement of a weight, the vertical movement is then converted into a rotary motion and the rotary motion is transmitted to the outside of the cylinder through a magnetic means, whereby an indicator pointer is moved.

Other objects and advantages of the present invention will further be clarified by the description given below with reference to the accompanying drawings.

Figure 1:
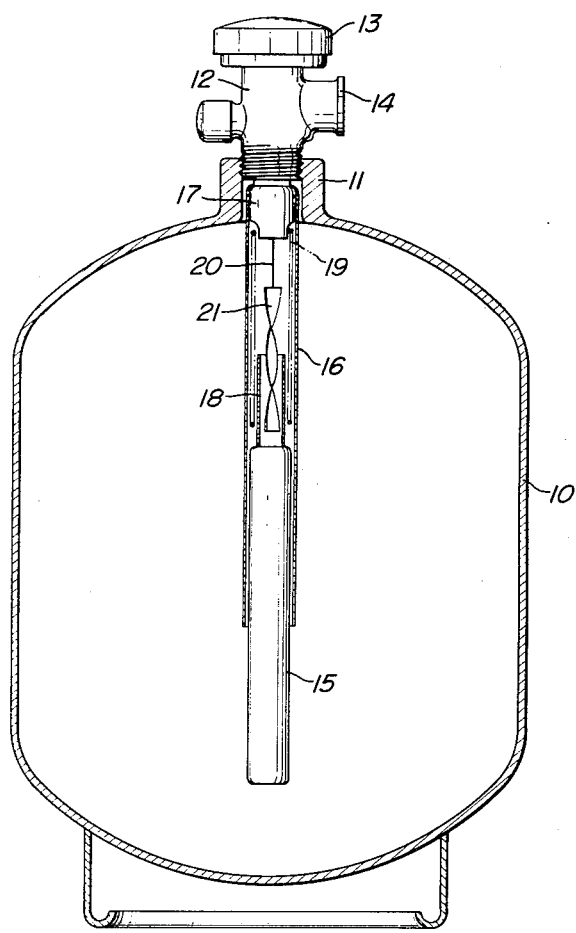
FIG. 1 is a sectional view of a liquified propane gas cylinder equipped with the liquid quantity measuring apparatus developed by the present invention.
Figure 3:
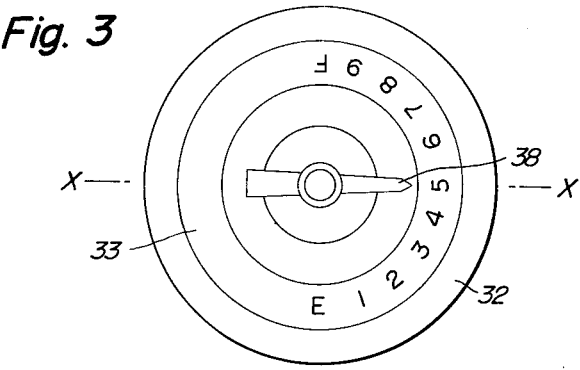
FIG. 3 is a plane view of the liquid quantity measuring apparatus developed by the present invention showing the indicator dial.

In the accompanying drawings, numeral 10 indicates a common liquified gas cylinder, on the top of which a valve attachment opening 11 is provided. A valve 12 is put on the opening 11. The valve 12 is provided with a knob 13, and a tube connection 14 is provided at its casing to hold a gas tube.

Into the lower end of valve 12, a supporting sleeve 17 supporting a guide tube 16 of a weight 15 is screwed. The supporting sleeve 17 has a gas passage 18' opened through its center (see FIG. 2). The guide tube 16 is fitted tight at its upper end to the outside wall of the supporting sleeve 17 by caulking, and an opening for gas passage is provided at the upper portion of the wall. The weight 15 is inserted into the guide tube 16 so as to freely make vertical movement and a suspending piece 18 is fitted tight and concentrically to the top of weight 15. In between the supporting sleeve 17 and suspending piece 18, a spring 19 is provided. Consequently, the weight 15 is suspended from the supporting sleeve 17 by the spring 19 through the suspending piece 18. The means to fit the spring 19 at its both ends to the supporting sleeve 17 and the suspended piece 18 may be welding or any other proper method.

The upper end of the suspending piece 18 is blinded with an end plate, and a small slit is provided at its center. A slender connecting rod 20 extending downward from the magnet 24 located at the lower portion of the valve 12 has, at its lower end, a spiral plate 21 made of thin and long strip sheet. This spiral plate 21 is inserted through the slit of suspending piece 18. In consequence, when the weight 15 moves up and down, the spiral plate 21 rotates by its relative motion with the slit, and that rotation is transmitted to the magnet 24 through the connecting rod 20. Thus the vertical movement of the weight by the change of liquid level inside the cylinder 10 is converted into a rotary motion.

The vertical movement of the weight 15 is based on the Archimedes' principle; when the quantity of the liquid in the cylinder increases, the volume of the weight 15 immersed under the liquid increases, the weight becomes lighter and is lifted upward to the forced balanced point of the spring 19. On the other hand, when the quantity of liquid decreases, the volume of the weight immersed under the liquid level is decreased, and the weight becomes heavier and comes downward overcoming the force of the spring 19.

Now, the means, whereby the rotation of the connecting rod due to the vertical movement of the weight is converted into the rotation of the indicator pointer located outside the cylinder, will be described.

Figure 2:
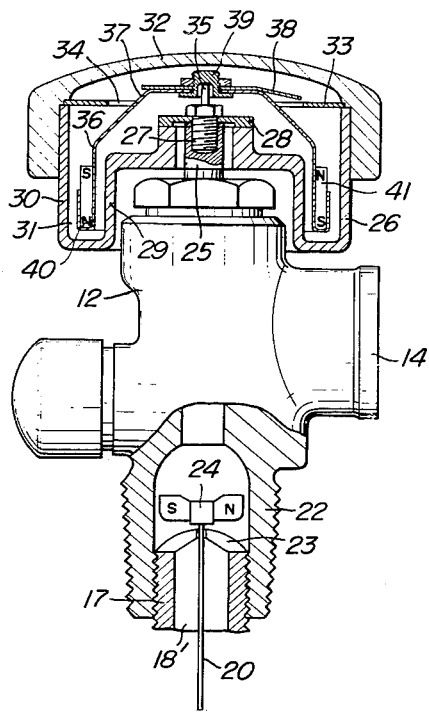
FIG. 2 is a sectional view along the line X—X of FIG. 3 and shows only an enlarged view of the indicator portion of the liquid quantity measuring apparatus.

As shown in FIG. 2, the valve 12 is provided at its lower portion with a connecting thread 22 screwed into the opening 11 of the cylinder 10 (see FIG. 1). The upper end of supporting sleeve 17 is tightly screwed into this connecting portion 22. A supporting bridge 23 is diametrically located across the opening at the upper end of the supporting sleeve 17. The upper end of connecting rod 20 is supported by the supporting bridge 23 so as to rotate freely. The upper end of connecting rod 20 is also extended upward through the supporting bridge 23, and a horizontal magnet piece 24 is fitted thereto. The magnet piece 24 is magnetized in horizontal direction and naturally its each end has opposite polarity respectively as indicated in the drawing.

The stem 25 of the valve 12 is projected above the valve body, and a driving body 26 is put on that projected portion with a bolt 27 and a spring washer 28. The driving body 26, serving as the handle of the valve, consists of the inner and outer walls 29 and 30, an annular gap 31 is provided between these walls, and a knob 32 is mounted to the outer peripheral surface of outer wall 30. The outer wall 30 and the knob 32 may be fitted together by screwing or any other suitable means. The knob 32 is made of a transparent synthetic resin material, and a dial 33 is located between the knob 32 and the upper end of the outer wall 30 of the driving body 26. The dial 33 is annular and a circular hole 34 is provided at its center.

On the top of bolt 27, an extended pin 35 is provided, by which an indicator driving member 36 is supported so as to rotate freely. The member 36 consists of a thin light metallic plate (anti-magnetic) or the other light material in a bell form, its top 37 is flat, and a pointer 38 is mounted thereon. The edge of the pin 35 is sharp so that the friction between the driving member 36 and a pivot 39 is minimized.

At the lower end of the outside of the member 36 a pair of permanent magnet pieces 40 and 41 are set diametrically in symmetrical positions. These magnet pieces 40 and 41 are of rod shape and fitted tight to the member 36 vertically so that their polarities are opposite against each other.

When a liquified gas is charged into the cylinder 10 through the valve 12, the lower portion of the weight 15 is submerged under the liquid. As soon as the lower portion of the weight 15 is submerged under the liquid, a floating force acts on the weight 15, and the downward action by the gravity of the weight decreases. With the decrease in weight of the weight 15 by the floating force like this, the spring 19 which is in balance with the weight 15 is compressed by the upward movement of weight 15 due to the floating force. The upward movement of the weight 15 becomes the relative movement of the slit against the spiral plate 21 and whereby the spiral plate is rotated.

When the spiral plate 21 is rotated as described above, the connecting rod 20 connected to the upper end of spiral plate 21 also rotates. Then the rotation of the connecting rod 20 rotates the magnet piece 24. The rotation of the magnet piece 24 is transmitted by its magnetic force to the magnet pieces 40 and 41. The rotation of these magnet pieces corresponds to that of the magnet piece 24. When the magnet piece 24 stops rotation, the magnet pieces 40 and 41 also stop at a position corresponding to that where the magnet piece 24 has stopped. Thus the rotation of the magnet pieces 40 and 41 in correspondence with that of the magnet piece 24 moves the pointer 38 through the member 36, and the pointer 38 indicates the corresponding figures of the dial 33 which have been set at the respective predetermined positions.

The above description has been given for the case wherein the liquid is filled into the cylinder, but the principle for the case wherein the liquid is consumed is exactly similar. The weight moves downward and the pointer rotates in the reverse direction through the magnetic force, then the remaining amount of the liquid in the cylinder is always indicated.

In the present invention, the rotary motion inside the cylinder is transmitted to the outside by means of the magnetic flux and no mechanically operated means is necessary. There is no danger of the gas leakage to the indicator portion at the top of valve when it is closed. The change of liquid level is transmitted to the slight vertical movement of the weight, which is converted to the rotation of the lower magnet, and then the upper magnet is rotated without any mechanical arrangement. This rotation of upper magnet directly indicates the weight of liquid. Therefore, no gas and liquid tight means is necessary for the indicating portion of the apparatus, even if the cylinder is filled with a high pressure gas or liquid. Consequently, the indicating portion of the apparatus developed by the present invention is simple in its construction and easily applicable to any cylinder of liquified gas being supplied in the open market.

What is claimed is:

An apparatus for measuring the quantity of liquid in a gas cylinder provided with an outlet valve comprising:

a supporting sleeve connected to said valve;

an elongated guide tube within said sleeve and coaxial therewith;

an elongated tensioned weight member, said weight member being suspended in said guide tube by means of a spring attached to said sleeve;

a spiral plate suspended along the axis of said tube, said plate being connected to said elongated weight member, the slight downward movement of said weight member imparting a rotational movement to said spiral plate member depending upon the level of the liquid in said cylinder;

a permanent magnet piece magnetized in the horizontal direction and mounted on the upper end of said spiral plate member;

a passage for gas provided in said sleeve;

a casing member arranged at the top of said valve;

a transparent knob at the top of said casing member serving to seal the casing member and as a handle for opening and closing said valve;

a pair of magnetic rod-shaped pieces mounted vertically in opposite polarity within said transparent knob;

an anti-magnetic member located in said transparent knob, said anti-magnetic member serving to suspendingly support said pair of magnetic rod-shaped pieces; and, an indicating means on the top of said anti-magnetic member which is visible through said knob and indicates the rotational movement of said spiral plate in response to the vertical movement of said elongated weight.

References Cited by the Examiner

UNITED STATES PATENTS

| | | | |
|---|---|---|---|
| 1,641,380 | 9/27 | Geyer | 73—320 X |
| 2,216,917 | 10/40 | Klumb et al. | 73—290.1 |
| 2,300,614 | 11/42 | Connolly et al. | 73—320 X |

FOREIGN PATENTS 746,478   3/33   France.

ISAAC LISANN, *Primary Examiner.*